United States Patent
Lee

(10) Patent No.: US 12,440,098 B2
(45) Date of Patent: Oct. 14, 2025

(54) METHOD AND SYSTEM FOR GLINT-BASED EYE DETECTION IN A REMOTE EYE TRACKING SYSTEM

(71) Applicant: Tobii AB, Danderyd (SE)

(72) Inventor: Hung-Son Lee, Danderyd (SE)

(73) Assignee: Tobii AB, Danderyd (SE)

( * ) Notice: Subject to any disclaimer, the term of this patent is extended or adjusted under 35 U.S.C. 154(b) by 384 days.

(21) Appl. No.: 18/068,962

(22) Filed: Dec. 20, 2022

(65) Prior Publication Data
US 2023/0190096 A1 Jun. 22, 2023

(30) Foreign Application Priority Data
Dec. 22, 2021 (SE) ..................... 2151597-8

(51) Int. Cl.
*G06V 40/19* (2022.01)
*A61B 3/113* (2006.01)
*G06V 40/18* (2022.01)

(52) U.S. Cl.
CPC .............. *A61B 3/113* (2013.01); *G06V 40/19* (2022.01); *G06V 40/193* (2022.01)

(58) Field of Classification Search
CPC ................................ G06V 40/19; A61B 3/113
See application file for complete search history.

(56) References Cited

U.S. PATENT DOCUMENTS

| | | | | |
|---|---|---|---|---|
| 2003/0098954 A1* | 5/2003 | Amir | ...................... | A61B 3/113 351/210 |
| 2007/0121065 A1* | 5/2007 | Cox | ...................... | A61B 3/113 351/209 |
| 2013/0178287 A1* | 7/2013 | Yahav | ...................... | G02B 27/01 463/32 |
| 2013/0243258 A1* | 9/2013 | Hennessey | ............. | A61B 3/113 382/103 |
| 2014/0313308 A1 | 10/2014 | Wang et al. | | |

(Continued)

OTHER PUBLICATIONS

SE2151597-8, "Swedish Search Report issued by the Swedish Patent and Registration Office for Patent Application No. 2151597-8 mailed Sep. 6, 2022", Sep. 6, 2022, 9.

*Primary Examiner* — Edward Park
(74) *Attorney, Agent, or Firm* — Christopher Ignatius Moylan

(57) ABSTRACT

The invention is related a method and a remote eye tracking system for determining a position of at least one eye of a subject. The method comprises the steps of: illuminating a face of a subject using at least one infrared (IR) illuminator off-axis from at least one image sensor; capturing at least one image of the face using the at least one image sensor at a time instant; and using a processing circuitry of the remote eye tracking system, performing processing steps of: determining at least one pupil candidate associated with the at least one image; determining at least one glint candidate associated with the at least one image; determining at least one pupil-glint candidate group, comprising at least one pupil candidate and at least one corresponding glint candidate; generating a score value for each of the at least one pupil-glint candidate groups; and determining an eye position of at least one eye of the subject in the at least one image based on the pupil-glint candidate group with the highest score value.

17 Claims, 4 Drawing Sheets

(56) References Cited

U.S. PATENT DOCUMENTS

| | | | |
|---|---|---|---|
| 2015/0199008 A1* | 7/2015 | Kim | H04N 23/20 |
| | | | 345/156 |
| 2015/0278576 A1 | 10/2015 | Horesh et al. | |
| 2018/0350070 A1* | 12/2018 | Ishii | G06T 7/70 |
| 2020/0326777 A1 | 10/2020 | Shoushtari et al. | |
| 2023/0190096 A1* | 6/2023 | Lee | A61B 3/113 |
| | | | 382/117 |

\* cited by examiner

METHOD AND SYSTEM FOR GLINT-BASED EYE DETECTION IN A REMOTE EYE TRACKING SYSTEM

CROSS-REFERENCES TO RELATED APPLICATIONS

The present application claims priority to Swedish patent application No. 2151597-8, filed Dec. 22, 2021, and is hereby incorporated by reference in its entirety for all purposes.

TECHNICAL FIELD

The present invention relates to the field of eye tracking. In particular, the present disclosure relates to a glint-based eye detection in a remote eye tracking system including a stereo eye tracker.

BACKGROUND

Different eye tracking systems are known in the art. Commonly, in order to be able to perform eye tracking, the pupil of a subject eye, and at least one glint, must be identified in an image captured by a camera associated with the eye tracking system. Many remote eye trackers use full face images and therefore need to run further algorithms for pupil detection and subsequent corresponding eye detection, as well as extracting eye features. An active illumination of the subject's face is needed to generate the at least one glint in the resulting image. In the images, false glints may also be present, caused by reflection of light sources other than the active illuminators or by reflections off reflective surfaces between the subject's eye and the illuminators, such as lenses of eyeglasses. The extracted features may then be employed to determine where the subject is looking, i.e., gaze position or gaze direction. Further, known eye trackers apply machine learning to increase accuracy of gaze position and/or direction estimation. However, in some cases, there may be additional difficulties in detecting subjects' eyes, such as only one eye being present or a subject wearing an eye patch, or a subject being a non-human primate or a mannequin head 3D model. For such cases, the known methods based on machine learning do not have sufficient data in order to effectively determine position of eye(s) and pupil(s) during the image processing, since the eye tracking systems utilizing machine learning are trained on human face/eye images with both eyes. The lack of images and annotated data for such exceptional cases makes the eye tracking systems utilizing machine learning impractical. Hence, there is need for alternative methods in eye tracking that improve operation in exceptional cases such as where there are difficulties in eye detection or when the subject is a non-human primate, a virtual human or a mannequin head 3D model.

A further specific problem of existing solutions, related to determination of eye position in remote eye trackers, is that it is hard to identify any false glints in the captured images, because accurate false glint detection requires an accurate estimate of the cornea position. It is therefore necessary to provide a method for determining a position of at least one eye of a subject in images that is robust for rejecting false glints. Therefore, there is need for improving eye tracking methods and systems.

SUMMARY OF THE INVENTION

An object of the present disclosure is to limit or mitigate for at least one of the issues described above.

According to a first aspect, there is provided a method for determining a position of at least one eye of a subject in images captured by a remote eye tracking system, the method comprising: illuminating a face of a subject using at least one infrared (IR) illuminator off-axis from at least one image sensor; capturing at least one image of the face using the at least one image sensor at a time instant; and using a processing circuitry of the remote eye tracking system, performing processing steps of: determining at least one pupil candidate associated with the at least one image; determining at least one glint candidate associated with the at least one image; determining at least one pupil-glint candidate group, comprising at least one pupil candidate and at least one corresponding glint candidate; generating a score value for each of the at least one pupil-glint candidate groups; and determining an eye position of at least one eye of the subject in the at least one image based on the pupil-glint candidate group with the highest score value. An advantage is that a computationally cheap and reliable method for determining eye position of a subject is obtained in the eye tracking system. This may be particularly useful where machine learning data is unavailable. A further advantage of the invention over the method exploiting machine learning data is that the method according to the invention is not dependent on appearances and view angles of the subject being tracked.

The step of determining at least one glint candidate associated with the at least one image may be determined by detection of a bright area of pixels in the at least one image. The brightness of said bright area may be larger than a glint brightness threshold. The radius of said bright area may satisfy a glint radius threshold.

The step of determining at least one pupil candidate associated with the at least one image may be determined by detection of a bright area of pixels in an inverted at least one image. The brightness of the bright area of pixels in the inverted at least one image may be larger than a pupil brightness threshold.

In another embodiment, the method step of determining at least one pupil candidate associated with the at least one image may be determined by detection of a dark area of pixels in the at least one image. The brightness of said dark area may be smaller than the pupil brightness threshold. The radius of said bright or dark area may satisfy a pupil radius threshold.

In the method, a glint candidate may be considered to be adjacent to a pupil candidate if the distance between the glint and the pupil candidates is below a distance threshold.

The step of generating the score value for each of the pupil-glint candidate groups may be based on determining at least one of a distance between each glint candidate and each pupil candidate or brightness of the glint candidate.

In the method, the maximum number of glint candidates for each pupil candidates in the pair of pupil-glint candidate groups may correspond to a number of IR illuminators in the remote eye tracking system.

The method may further comprise the step of determining an angle of line between the determined glint candidate and at least one further glint candidate satisfying an angle of line threshold while determining at least one further glint candidate associated with the at least one image.

In another embodiment, the method may be performed by capturing a first image using a first image sensor and a second image using a second image sensor, the first and second images being captured at the time instant, producing stereoscopic images. In the method, a step of generating the score value may be based on determining a distance between each pupil-glint candidate group in stereoscopic images respectively.

In the method, the at least one image may be a full-frame image.

The method may be used on a non-human primate (NHP) subject, for example macaques, chimpanzees, bonobos or gorillas.

According to a second aspect, there is provided a remote eye tracking system for determining a position of at least one eye of a subject in images captured by at least one image sensor associated with the remote eye tracking system, the remote eye tracking system comprising at least one infrared (IR) illuminator off-axis from at least one image sensor and comprising a processing circuitry being configured to: determine at least one pupil candidate associated with the at least one image; and determine at least one glint candidate associated with the at least one image; and determine at least one pupil-glint candidate group, comprising at least one pupil candidate and at least one corresponding glint candidate; and generate a score value for each of the at least one pupil-glint candidate groups; and determine an eye position of at least one eye of the subject in the at least one image based on the pupil-glint candidate group with the highest score value. An advantage is that a computationally cheap and reliable method for determining eye position of a subject is obtained in the eye tracking system. This may be particularly useful where machine learning data is unavailable. A further advantage of the invention over the prior art is that the system may efficiently determine the eye(s) position of the subject regardless of subjects' appearances or view angles of the subject being tracked.

In the remote eye tracking system, the at least one glint candidate may be determined by detection of a bright area of pixels in the at least one image. The brightness of said bright area may be larger than a glint brightness threshold. The radius of said bright area may satisfy a glint radius threshold.

In the remote eye tracking system, the pupil candidate may be determined by detection of a bright area of pixels in an inverted at least one image. The brightness of the bright area of pixels in the inverted at least one image may be larger than a pupil brightness threshold.

In another embodiment, the pupil candidate may be determined by detection of a dark area of pixels in the at least one image. The brightness of the said dark area may be smaller than the pupil brightness threshold. The radius of said bright or dark area may satisfy a pupil radius threshold.

In the remote eye tracking system, a glint candidate may be considered to be adjacent to a pupil candidate if the distance between the glint and the pupil candidates is below a distance threshold.

The processing circuitry comprised in the remote eye tracking system may be configured to generate the score value for each of the pupil-glint candidate groups being based on determining at least one of a distance between each glint candidate and each pupil candidate or brightness of the glint candidate.

In the remote eye tracking system, the maximum number of glint candidates for each pupil candidates in the pair of pupil-glint candidate groups may correspond to a number of IR illuminators in the remote eye tracking system.

The processing circuitry comprised in the remote eye tracking system may further be configured to determine at least one further glint candidate associated with the at least one image, wherein the processing circuitry may be configured to determine an angle of line between the determined glint candidate and at least one further glint candidate satisfying an angle of line threshold.

In another embodiment, the remote eye tracking system comprises a first image sensor that may capture a first image and a second image sensor that may capture a second image, the first and second images being captured at the time instant, producing stereoscopic images.

The processing circuitry comprised in the remote eye tracking system may further be configured to generate the score value based on determining a distance between each pupil-glint candidate group in stereoscopic images respectively.

In the remote eye tracking system, at least one image may be a full-frame image.

According to a third aspect, there is provided a non-transitory computer-readable storage medium storing instructions which, when executed by processing circuitry of a remote eye tracking system, cause the eye tracking system to: determine at least one pupil candidate associated with the at least one image; and determine at least one glint candidate associated with the at least one image; and determine at least one pupil-glint candidate group, comprising at least one pupil candidate and at least one corresponding glint candidate; and generate a score value for each of the at least one of pupil-glint candidate groups; and determine an eye position of at least one eye of the subject in the at least one image based on the pupil-glint candidate group with the highest score value. An advantage is that a computationally cheap and reliable method for determining eye position of a subject is obtained in the eye tracking system. This may be particularly useful where machine learning data is unavailable.

The inventors have realized that low-level features in the images can be used in the determination of a position of at least one eye of a subject in images. In some embodiments, glint candidates may be determined from the at least one image, while pupil candidates may be determined from an inverted at least one image. Alternatively, the pupil candidate may be determined from the at least one image. This provides for a simple and computationally effective image processing.

The non-transitory computer-readable storage medium may further store instructions which, when executed by processing circuitry of a remote eye tracking system, cause the system to perform the method steps for determining a position of at least one eye of a subject in images captured by a remote eye tracking system.

The effects and/or advantages presented in the present disclosure for embodiments of the method according to the first aspect may also apply to corresponding embodiments of the remote eye tracking system according to the second aspect and the non-transitory computer-readable storage medium according to the third aspect.

BRIEF DESCRIPTION OF THE DRAWINGS

Specific embodiments will now be described in detail with reference to the accompanying drawings, in which.

Figure 2:
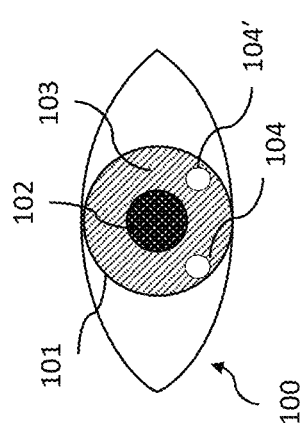
FIG. 2 shows a front view of an eye of a subject.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Aspects of the present disclosure will be described more fully hereinafter with reference to the accompanying drawings. The devices and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. As used herein, the singular forms "a", "an" and "the" are intended to include the plural forms as well, unless the context clearly indicates otherwise.

Embodiments of the present disclosure aim at solving the problems in eye tracking based on machine learning when the system does not have sufficient data, such as infrared (IR) or near-infrared (NIR) images of a subject, wherein the subject being a non-human primate or a mannequin head 3D model, in order to train the system to effectively determine position of eye(s) and pupil(s) of the subject during the image processing.

Any embodiment described herein as referring to one eye, for instance at least one eye of a subject is equally applicable to any of the subjects' eyes and may also be performed for both the eyes of a subject in parallel, or consecutively.

An example of a remote eye tracking system according to an embodiment will now be described with reference to FIGS. 1 and 3. Hereinafter, the remote eye tracking system may also be referred to as simply the system.

Figure 1:
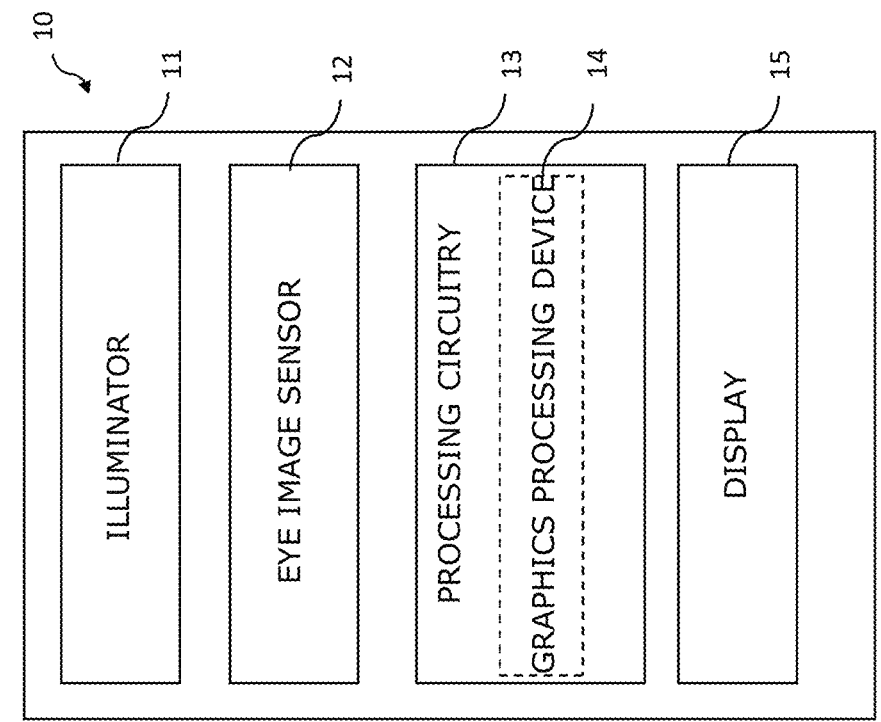
FIG. 1 shows a schematic overview of a remote eye tracking system, according to one or more embodiments.

The remote eye tracking system 10 according to an embodiment in FIG. 1 comprises at least one infrared (IR) illuminator 11 for actively illuminating the eyes of a subject and at least one imaging sensor 12 for capturing images of the face of the subject. The system 10 comprises processing circuitry 13 for image processing such as digital image processing for extracting features in the image. In the embodiment of FIG. 1, a graphics processing device 14 is utilised to provide the digital image processing, but in other embodiments a separate processing device need not be provided. In the embodiment of FIG. 1, the system 10 comprises a display 15 towards which the subject is gazing. In other embodiments a separate display may be provided as an external device or alternatively no display may be provided, for example where the eye tracking of the subject is not display-related. The remote eye tracking system 10 captures at least one image of the face of the subject using the at least one image sensor 12 at a time instant.

Figure 3:
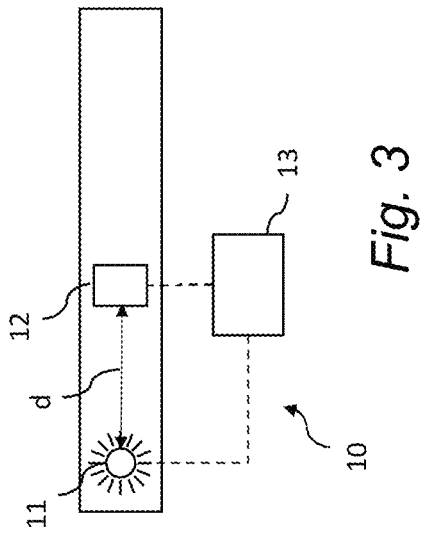
FIG. 3 shows a schematic overview of a remote eye tracking system, according to one or more embodiments.

FIG. 3 depicts the system with one IR illuminator 11, one imaging sensor 12 and processing circuitry 13, while the display 15 is not shown in FIG. 3. Whilst the described embodiment comprises only one IR illuminator 11, in other embodiments there may be two or more IR illuminators, dome-shaped diodes, or an array of such diodes that can be used as IR illuminators. FIG. 3 depicts only one image sensor 12. It is to be understood that any number of image sensors 12 may be present in the remote eye tracking system 10 according to other embodiments. For example, if the remote eye tracking system 10 comprises two or more image sensors 12 and two or more images are captured, one image per respective image sensor, each of these images is captured at the same time instant, wherein a first image sensor captures a first image and a second image sensor captures a second image, producing stereoscopic images.

The image sensor 12 or imaging device may for example be a camera such as a complementary metal oxide semiconductor (CMOS) camera or a charged coupled device (CCD) camera. However, the image sensor can be any other type of imaging device, including light sensors etc.

In an example, the at least one captured image is a full-frame image, meaning that the entire pixel array, for example CCD, is used to detect incoming photons during the exposure to the subject being imaged. An advantage is that the image sensor is provided with more light and details being captured that in turn, allows the capture of a full scene including the face of the subject, which is helpful in further image processing when extracting specific features from the captured images.

The processing circuitry 13 may for example comprise one or more processors. The processor(s) may for example be application-specific integrated circuits (ASIC) configured to perform a specific eye tracking and eye position determination method. Alternatively, the processor(s) may be configured to execute instructions (for example in the form of a computer program) stored in one or more memories. Such a memory may for example be comprised in the system 10 or may be external to (for example located remotely from) the system 10. The memory may store instructions for causing the system 10 to perform a method according to any of the embodiments presented in connection with FIG. 5. The processing circuitry 13 may in one or more embodiments be configured to perform any or all of the method embodiments described in connection with FIG. 5.

The following features are described in relation to at least one IR illuminator 11, the same features are valid for any number of IR illuminators and are well understood by a skilled person. The at least one IR illuminator 11 may each be emitting light in the IR frequency band, or in the near-infrared frequency (NIR) band. The illuminators may be light emitting diodes (LEDs), lasers, such as vertical-cavity surface-emitting lasers (VCSELs) or any other type of illuminators. The term illuminator may be understood as comprising a single illuminator, or alternatively as comprising a group of two or more illuminators that are arranged very closely together and controlled to act as a single light source, i.e., which are controlled to operate such that they together cause a single glint per eye in each captured image when illuminated.

To better understand the glints, FIG. 2 shows schematically a front view of an image of an eye 100 of a subject captured by at least one image sensor 12 of the remote eye tracking system 10. FIG. 2 discloses the eye 100, a cornea 101, a pupil 102 and an iris 103. Further, in this example, the eye 100 has a reflection 104 at the cornea 101, the reflection 104 being caused by the illuminator 11. Such reflection 104 is known as a glint 104. FIG. 2 shows schematically the location of the glint 104, it is to be understood that the glint may be positioned in other locations with respect to the pupil 102, for example, above the pupil 102 or below the pupil 102 or inside the pupil 102. In other embodiments, the captured image of the eye 100 may further comprise further glints, for example, shown as a second glint 104' in FIG. 2, the second glint 104' being caused by a further illuminator comprised in the system 10.

Reference is now made to FIG. 3. The IR illuminator 11 is positioned off-axis from the image sensor 12 at a distance d, which means that it is spaced apart from the image sensor 12, i.e., positioned further away from a focal centre of the image sensor 12 and has a non-coaxial position with respect to the imaging sensor 12. In other words, it is important that the IR illuminator 11 and the imaging sensor 12 are arranged at least a certain non-zero distance d from each other. This distance d is dependent on the intended distance to the plane in which the subject's face is located and the wavelength of the IR illuminator. In such a configuration, the eye tracking system 10 is capturing dark pupil (DP) images. DP images are to be understood as having a darker pupil 102 than the iris 103 surrounding it in the captured DP images as shown in FIG. 2. This is due to the fact that when IR illuminator 11 illuminates the eye, light reflected at a retina, i.e., a surface at the back of an eye, does not reach the image sensor 12 and the pupil appears in this way. Thereby, the remote eye tracking system 10 is configured to obtain DP images of the subject's eye.

In an embodiment, the maximum number of glints 104 per detected eye 100 corresponds to a number of IR illuminators 11 in the remote eye tracking system 10. Having two or more glints 104, 104' per detected eye 100 improves robustness of the method for determining eye position of the subject.

Figure 4:
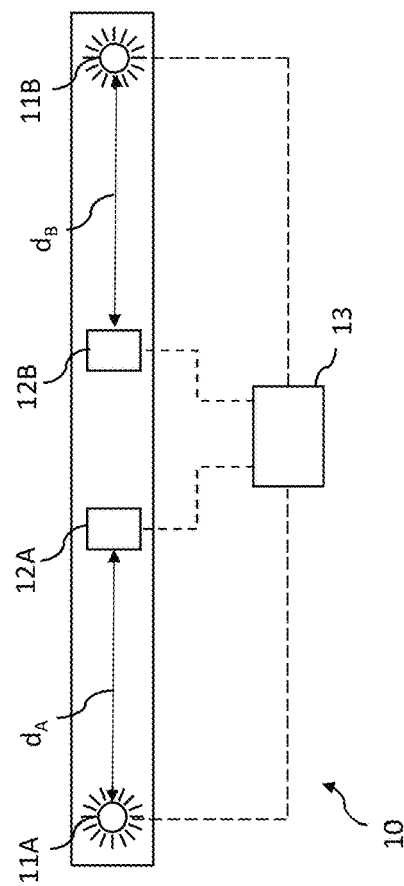
FIG. 4 shows a schematic overview of a remote eye tracking system, according to one or more embodiments.

Reference is now made to FIG. 4. In this embodiment, the system 10 comprises two IR illuminators 11A, 11B that are positioned off-axis from a first image sensor 12A at a distance $d_A$, and from a second image sensor 12B at a distance $d_B$, respectively. Each one of the IR illuminators 11A and 11B are spaced apart from the respective first and second image sensors 12A and 12B. In an embodiment, the orientation of IR illuminators 11A, 11B is horizontal with respect to the subject, i.e., a reference line connecting two illuminators 11A, 11B is a horizontal line. Other orientations of IR illuminators may also be used, which are known to a skilled person. Similar to the embodiment in FIG. 3, it is important that the IR illuminators 11A, 11B and the imaging sensors 12A, 12B are arranged at least a certain non-zero distance $d_A$, $d_B$, respectively from each other. A skilled person understands that the features described with respect to FIG. 3 are also valid for the embodiment in FIG. 4. Thereby, the remote eye tracking system 10 of this embodiment is configured to obtain DP images of the subject's eye.

Figure 5:
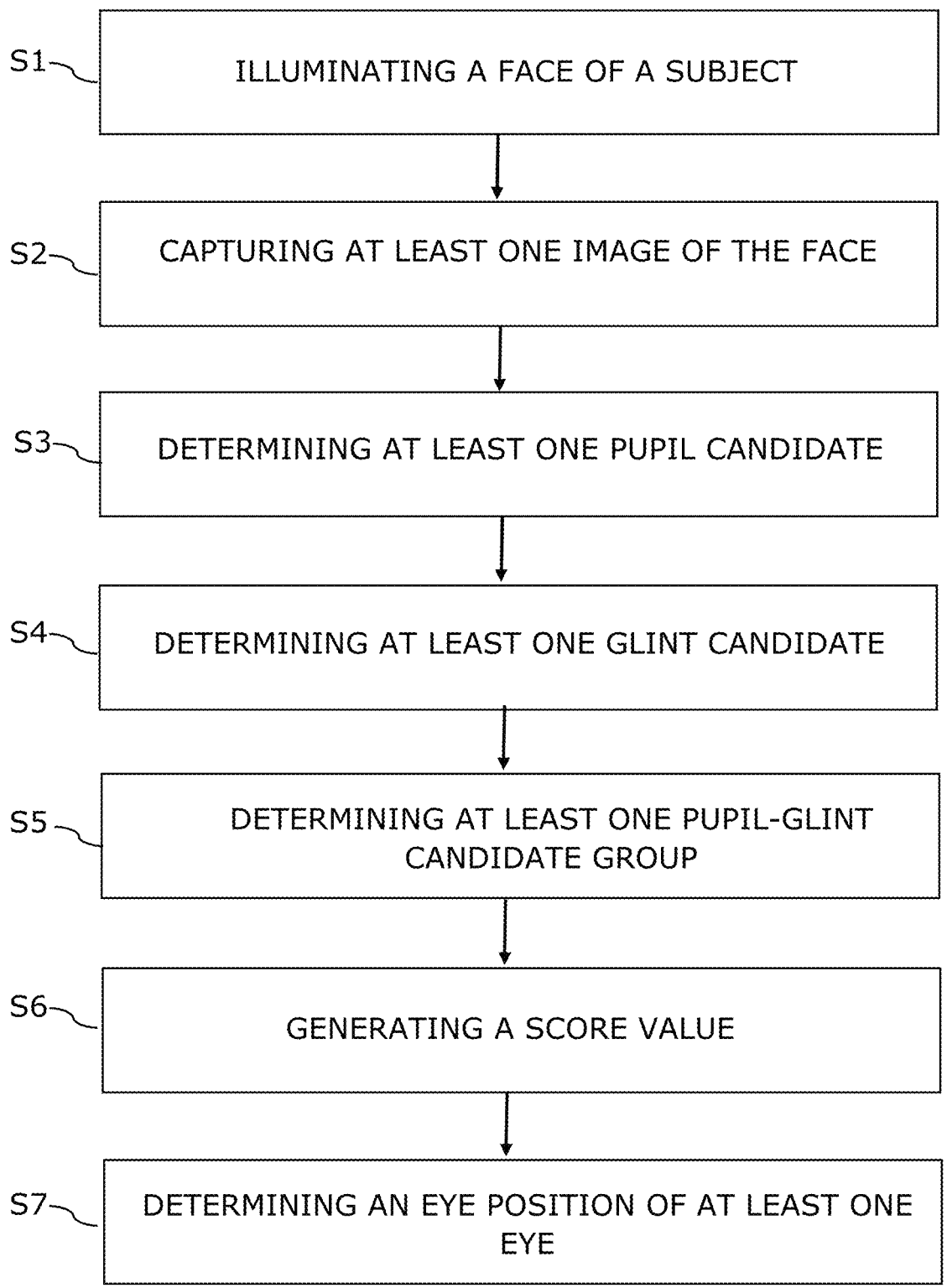
FIG. 5 is a flow chart of a method according to one or more embodiments.

The method of the invention will now be described with respect to FIGS. 5 and 6. FIG. 5 shows a method for determining a position of at least one eye of a subject in images captured by a remote eye tracking system 10. The method comprises the steps of:
illuminating S1 a face of a subject using at least one infrared (IR) illuminator off-axis from at least one image sensor;
capturing S2 at least one image of the face using the at least one image sensor at a time instant; and
using a processing circuitry of the remote eye tracking system, performing processing steps of:
determining S3 at least one pupil candidate associated with the at least one image;
determining S4 at least one glint candidate associated with the at least one image;
determining S5 at least one pupil-glint candidate group, comprising at least one pupil candidate and at least one corresponding glint candidate;
generating S6 a score value for each of the at least one pupil-glint candidate groups; and
determining S7 an eye position of at least one eye of the subject in the at least one image based on the pupil-glint candidate group with the highest score value.

Steps S1 and S2 are conventional in eye tracking and are well-known in the art, hence, these steps are only briefly discussed. Commonly, a face of a subject is illuminated using at least one infrared (IR) illuminator and at least one image of the face is captured using the at least one image sensor at a time instant. The captured images are DP images due to the off-axis position of the IR illuminator from at least one image sensor, as discussed related to FIGS. 3 and 4.

In step S3, the processing circuitry of the remote eye tracking system determines the presence of at least one pupil candidate in an image captured by the image sensor. Each pupil candidate is a position in the image that has characteristics indicative of the presence of the pupil of the subject. In the present embodiment, pupil candidates are determined by consideration of the brightness of pixels in the captured image. A pupil brightness threshold is introduced. More specifically, the processing circuitry is configured to identify dark areas of the image where a group of adjacent pixels are darker, i.e., have a lower intensity, than the pixels surrounding these areas, according to the pupil brightness threshold.

In some embodiments, the pupil candidate may be identified by determining a radius of the area of dark pixels and comparing this radius to a pupil radius threshold. For example, a dark area might be considered to be indicative of the presence of a pupil when the dark area is between 5 and 50 pixels. FIG. 6 shows an example of six detected pupil candidates 601-606, shown schematically as dark circles of various radii. It will be understood that the pupil candidate will not always be a perfect circle. As such, the pupil radius threshold may be applied to one axis of the dark area, for example the axis in which the area is largest or smallest, or to two orthogonal axes of the dark area of pixels, or as an average of two orthogonal axes of the dark area of pixels. In some embodiments, the pupil radius threshold may be applied to an approximation of a circle fitted to the area of pixels. Other ways in which a pupil radius threshold may be applied to an area of pixels in an image will be known to the skilled person.

The darkness of the dark pupils may also be compared to the pupil brightness threshold, whereby a pixel is considered to be "dark" when its intensity is below a threshold intensity. The threshold intensity might be an absolute intensity or may be a threshold intensity that is, for example, a proportion or percentage of the average intensity of the captured image.

In some embodiments, Step S3 may be realized by the processing circuitry of the remote eye tracking system 10 performing the steps of determining at least one pupil candidate associated with the at least one image of the subject's face by detection of a bright area of pixels in an inverted at least one image. The method step is substantially the same as discussed above, but with a difference that the processing circuitry is configured to identify bright areas of the inverted image instead of identifying dark areas in the image. The method comprises the step wherein the processing circuitry is configured to identify bright areas of the inverted image where a group of adjacent pixels are brighter, i.e., have a higher intensity, than the pixels surrounding these areas. In such an embodiment, the pupil candidate may be identified by determining a radius of the area of bright pixels and comparing this radius to a pupil radius threshold.

Similarly, a bright area might be considered to be indicative of the presence of a pupil when the bright area is between 5 and 50 pixels.

In an embodiment, the brightness of the bright area of pixels in the inverted at least one image is larger than a pupil brightness threshold. In an example, the pupil brightness threshold is 100 and the brightness of the bright area of pixels in the inverted at least one image is between 100 and 255 in an 8-bit image.

Alternatively, the pupil candidate is determined by detection of a dark area of pixels in the at least one image. In this case, the image is not inverted and the brightness of the said dark area is smaller than the pupil brightness threshold, for example, between 0 and 100, where in the pupil brightness threshold is 100. In an embodiment, each pupil candidate may have the following information: radius of the detected dark or bright area of pixels, depending on whether the image processing is done on the original or inverted captured image, respectively, brightness and a 2D position in its image such as horizontal and vertical coordinates, denoted by x and y in a Cartesian coordinate system. It is to be noted that in the context of this disclosure, brightness refers to a pixel intensity in terms of a single value, for example from a grey-scale image. In other embodiments, the term "brightness" may refer to a mean intensity value over a region of pixels or a maximum pixel intensity.

In Step S4 the processing circuitry of the remote eye tracking system 10 performs the steps of determining at least one glint candidate associated with the at least one image of the subject's face by detection of a bright area of pixels in the at least one image. The step of determining glint candidates is similar to the step of determining pupil candidates, where the pupil candidates are identified as a bright area of pixels, with the differences to a glint radius threshold value and a glint brightness threshold value since glints are substantially smaller than pupils. To reword, each glint candidate is a position in the image that has characteristics indicative of the presence of the glint of the subject's eye and glint candidates are determined by consideration of the brightness of pixels in the captured image. By utilizing a similar determination step for both pupil and glint candidates, the method provides an advantage over prior art in that a computationally cheap and reliable method for determining eye position of a subject is obtained in the eye tracking system.

In such an embodiment, the glint candidate may be identified by determining a radius of the area of bright pixels and comparing this radius to a glint radius threshold. Similarly, a bright area might be considered to be indicative of the presence of a glint when the bright area is between 2 and 5 pixels. It is to be understood that the radius of the detected area of pixels is an average approximation of a circle that covers a concentration of neighboring pixels. FIG. 6 shows an example of seven detected glint candidates 610-617, shown schematically as white circles.

In an embodiment, each glint candidate may have the following information: radius of the detected bright area of pixels, brightness and a 2D position in its image such as horizontal and vertical coordinates, denoted by x and y in a Cartesian coordinate system. It is to be noted that in the context of this disclosure, brightness refers to a pixel intensity in terms of a single value, for example from a grey-scale image. In other embodiments, the term "brightness" may refer to a mean intensity value over a region of pixels or a maximum pixel intensity.

In an embodiment, the brightness of the bright area of pixels in the at least one image is larger than a glint brightness threshold. In an example, the glint brightness threshold is 160 and the brightness of the bright area of pixels in the at least one image is between 160 and 255 in an 8-bit image.

In Step S5 the processing circuitry of the remote eye tracking system 10 performs the steps of determining at least one pupil-glint candidate group, comprising at least one pupil candidate and at least one corresponding glint candidate. Hence, a matching between pupil candidates 601-606 and glint candidates 610-617 is performed in order to determine which ones of these candidates correspond to an eye of the subject and which candidates are false pupils or false glints. As discussed with respect to FIG. 2, the eye 100 has the pupil 102 and at least one glint 104 at the cornea 101.

In order to be classified as a pupil-glint candidate group, the pupil candidate should have at least one accompanying glint candidate adjacent to it. In the example method, the glint candidate is considered to be adjacent to the pupil candidate if the distance between the glint and the pupil candidates is below a distance threshold. For example, with reference to FIG. 6, it can be assumed that the pupil candidate 601 has four adjacent glint candidates 610, 611, 612 and 614, but only one glint candidate 610, which is the closest glint candidates out of four, that satisfies the distance threshold. In this way, it can be assumed that the pupil candidate 601 has one glint candidate 610 caused by one illuminator 11 and such a combination is considered to form one pupil-glint candidate group. If a pupil candidate does not have at least one adjacent glint candidate, for example, pupil candidate 603 in FIG. 6, the pupil candidate is discarded from further calculations related to the pupil-glint candidate group.

In an embodiment, the pupil candidate may also have two glints candidates if the remote eye tracking system 10 comprises two IR illuminators 11A and 11B as shown in FIG. 4. The maximum number of glints candidates per detected eye 100 may correspond to a number of IR illuminators 11 in the remote eye tracking system 10 under the condition that the subject's face is facing toward the system, i.e., is substantially parallel with respect to the remote eye tracking system 10. For example, if the subject's face is rotated away from the remote eye tracking system at some degree, the number of glints may be less that the number of IR illuminators 11 in the remote eye tracking system 10. Having two or more glint candidates per detected eye 100 improves robustness of the method for determining eye positions of the subject.

Figure 6:
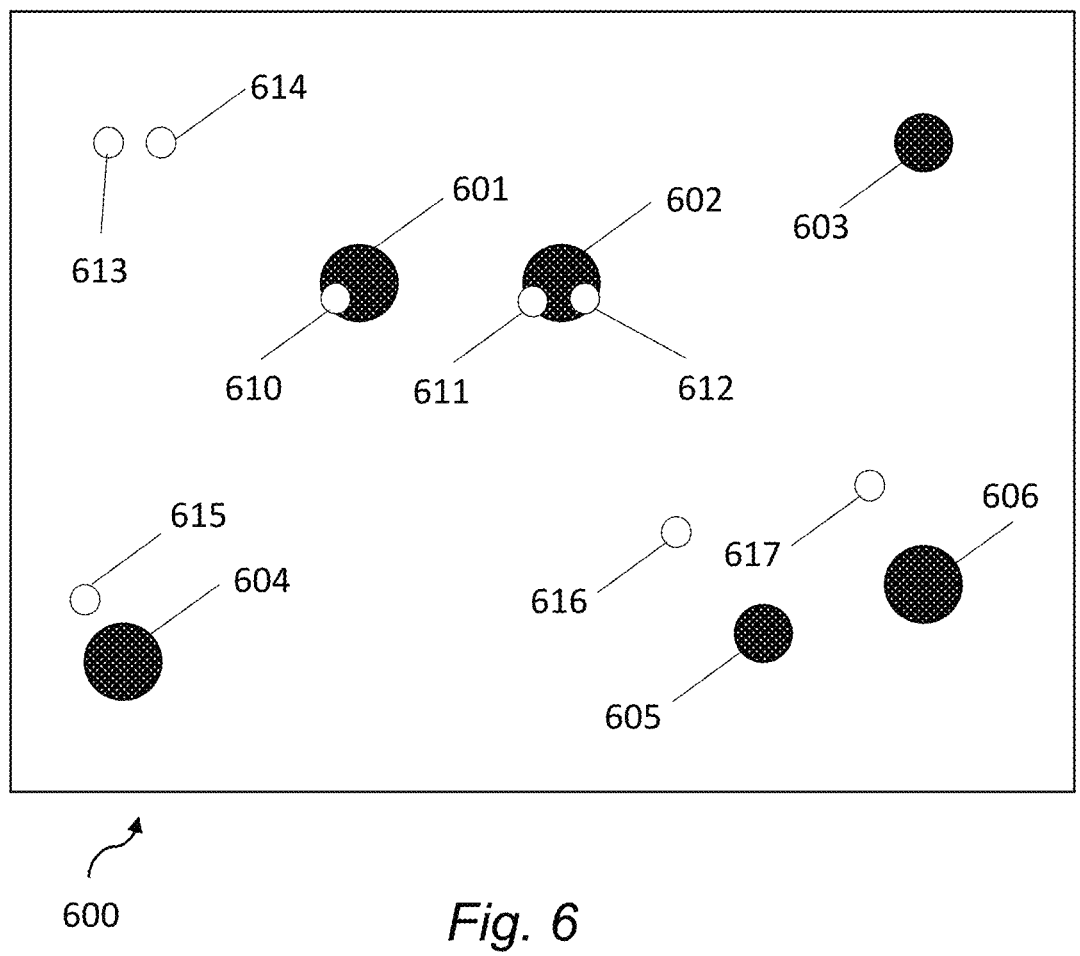
FIG. 6 shows an example of method according to one or more embodiments.

With reference to FIG. 6, a pupil-glint candidate group may include the pupil candidate 602 and two glint candidates 611 and 612. Both glint candidates 611, 612 are positioned at a distance below the distance threshold with respect to the pupil candidate 602. For example, glint candidates 613, 614 are more likely to be classified as false glints and could not be assumed as being adjacent to the pupil candidate 602, since they are positioned farther away from the pupil candidate 602. To begin with, a first glint candidate 611 is determined to be adjacent to pupil candidate 602 and they are assumed to build a pupil-glint candidate group. To determine if a second glint candidate 612 belongs to the same pupil-glint candidate group, in one embodiment, the processing circuitry determines an angle of line between the determined glint candidate 611 and any further glint candidate, for example 612. This is based on the assumptions that since the IR illuminators 11A, 11B are positioned aligned to each other and the subject's eye corneas are spherical, the reflections caused by the illuminators 11A, 11B would have similar alignment, i.e., the glint candidates would have the same alignment as the IR illuminators 11A, 11B. For example, if the IR illuminators 11A, 11B are positioned horizontally with respect to each other, then the reflections caused by the illuminators 11A, 11B would have near horizontal alignment. In other embodiments, a different orientation of the illuminators may result in a different criterion for determination of a further glint candidate. Hence, a pair of glints candidates 611, 612 are assessed with respect to pupil candidate 602. The angle of the line is to be understood as an angle between an imaginary line connecting two glint candidates from the pair of glint candidates with respect to a horizontal line. Since each glint candidate has a known respective 2D position in its image ($x_1$, $y_1$ and $x_2$, $y_2$, respectively), the angle of line $\alpha$ is easily calculated by a known trigonometry equation:

$$\alpha(1, 2) = \tan^{-1}\left(\frac{y_2 - y_1}{x_2 - x_1}\right)$$

If the angle of line in the pair of glints (i.e., between the determined glint candidate and at least one further glint candidate) is larger than an angle of line threshold (e.g., greater than 20 degrees) and/or the distance between glint candidates is too large (e.g., larger than 50 pixels) or too small (e.g., less than 5 pixels), the at least one further glint candidate is classified as a false glint.

The result of Step S5 is at least one pupil-glint candidate group, and that each pupil-candidate group comprises at least one pupil candidate and at least one glint candidate, wherein the maximum number of glint candidates per detected eye 100 may correspond to a number of IR illuminators 11 in the remote eye tracking system 10 under the condition that the subject's face is facing toward the system, i.e., is substantially parallel with respect to the remote eye tracking system 10. For example, if the subject's face is rotated away from the remote eye tracking system at some degree, the number of glints may be less than the number of IR illuminators 11 in the remote eye tracking system 10.

In Step S6 the processing circuitry of the remote eye tracking system 10 performs the steps of generating a score value for each of the at least one pupil-glint candidate groups. The score value for each of the at least one pupil-glint candidate groups is based on determined properties of each of glint and the pupil candidates. In a non-limiting example, the score value is based on a combination of distance between the glint and the pupil candidate, glint candidate brightness and calculated angle of line between the determined glint candidate and any further glint candidate. For example, for a pupil-glint candidate group of pupil candidate 602 and corresponding glint candidates 611, 612 the score may be calculated according to the following equation:

$$\text{Score} = \left(1 - c_3 * \frac{\alpha\,(611, 612)}{\alpha_0}\right) \cdot \left(c_1 * \left(\frac{\text{Brightness}(612)}{\text{max(Brightness)}}\right)^2 + c_2 * \left(\frac{\text{min(Distance)} + \varepsilon_1}{\text{(Distance}(602, 612) + \varepsilon_2}\right)^2\right)$$

$c_1$, $c_2$, $c_3$ are constants, $\varepsilon_1$ and $\varepsilon_2$ are very small numbers in the order of $1e^{-5}$, $\alpha_0$ is a constant related to a rough estimation of maximum angle with respect to a reference alignment of the illuminators, max(Brightness) is the maximum brightness among all of the determined glint candidates 610-617 and min(Distance) is the minimum distance among all distances calculated from pupil candidate 602 to any other glint candidate 610-617. In another example, e.g., relating to the pupil-glint candidate group with the pupil candidate 601 and the glint candidate 610, the score value needs not to include calculation of the angle of line $\alpha$.

A person skilled in the art may employ different combinations of the determined properties of each of glint and pupil candidates in manners known in the art. The result of Step S6 may be an array of score values for each of the pupil-glint candidate groups. Alternatively, the result of Step S6 may be a single score value, such as the highest score value for each of the pupil-glint candidate group. For example, if there is only one eye detected, there would be one pupil-candidate group, if it is determined that two eyes are present in the image, there would be two pupil-candidate groups, one for each eye.

In Step S7 the processing circuitry of the remote eye tracking system 10 performs the steps of determining an eye position of an eye of the subject in the at least one image based on the pupil-glint candidate group with the highest score value. The pupil-glint candidate group with the highest score value may be considered as a true subject's eye with a pupil and corresponding glint(s). It is understood that a subject may have one or two eyes, and hence, the position(s) of one or two eyes is/are determined in this step. The position of each eye in the at least one image is calculated from the pupil's position and accompanied glint position(s), since these coordinates are known from previous steps of the method.

In an example embodiment, the method of determining a position of at least one eye of a subject is performed in the system 10 that comprises two IR illuminators 11A, 11B and two image sensors, such as the first and the second image sensors 12A, 12B, respectively, as depicted in FIG. 4. In this embodiment, Step S2 is performed by capturing a first image using a first image sensor 12A and a second image using a second image sensor 12B, the first and second images being captured at the same time from different positions, producing stereoscopic images, i.e., a pair of images. Each image in the stereoscopic images may have a respective pupil-glint candidate group corresponding to one eye or both eyes, if present. Steps S3-S6 may be performed in parallel on each of the stereoscopic images or may be run one after another, i.e., steps S3-S6 first performed on the first image and then steps S3-S6 being performed on the second image.

In such an example, Step S6 may further comprise generating the score value based on determining a distance between each pupil-glint candidate group in stereoscopic images respectively. The distance between first pupil-glint candidate group in the first image and second pupil-glint candidate group in the second image is calculated based on a known triangulation concept in three-dimensional (3D) space using epipolar geometry, which is briefly described with reference to FIG. 7. The concept of stereo matching is known to a skilled person, see reference for example in Yang Liu, J. K. Aggarwal, 3.12—Local and Global Stereo Methods, Editor(s): AL BOVIK, Handbook of Image and Video Processing (Second Edition), Academic Press, 2005, Pages 297-308.

Figure 7:
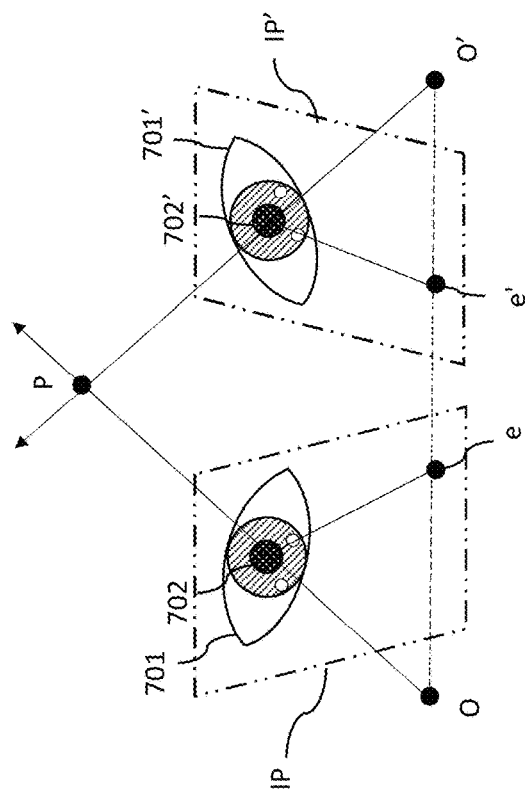
FIG. 7 shows an example of epipolar geometry utilized in the method according to one or more embodiments.

FIG. 7 depicts an image of an eye 701 seen from different points O and O' which have known 3D coordinates, since these points represent the locations of the first and second image sensors 12A, 12B respectively. The same eye is seen from point O as an eye 701 and as an eye 701' from point O'. The rays originating from O and O' intersect at a unique point P. This point P, representing a pupil, is captured at points 702 and 702' in a respective image. Centre points of 702 and 702' are called corresponding points since they are the projections of the same pupil. A line OO' that is connecting the centres of each of the image sensors 12A, 12B is called a baseline OO'. Further in FIG. 7 are depicted two epipoles e and e'. Epipoles e, e' are the intersections of the baseline OO' and image planes IP and IP'. A line in the image plane IP with origin at e and end point being a centre of the pupil 702, though which the ray originating from O goes, is called an epipolar line. There is another epipolar line in the image plane IP' with origin at e' and end point being a centre of the pupil 702', though which the ray originating from O' goes. Using these epipolar lines, a distance from the centre point of the pupil 702' to the epipolar line corresponding to the centre point of the pupil 702 can be calculated. Based on the epipolar geometry in FIG. 7, a value of the pupil 702 is uniquely defined to the corresponding pupil 702' by reducing the calculations to a two-dimensional space. Since the positions O, O' of the first and second image sensors 12A, 12B are known, and so are pixel coordinates (x, y) for each of the points 702, 702', the correspondence between first and second images is attained. The same is valid for all the components in a respective pupil-glint candidate group known, both for pupil candidates and for glint candidates. Since one of the first or second pupil-glint candidates' groups may be considered as an epipolar constraint to the other one of the first or second pupil-glint candidate group, the distance between each pupil-glint candidate group in stereoscopic images is determined. Furthermore, the determined distance may be used in generating the score value for each pupil-glint candidate group.

Of course, the embodiments described herein also work perfectly well when the method is applied on a non-human primate (NHP) subject, for example, macaques, chimpanzees, bonobos or gorillas or a mannequin head 3D model.

The method steps described above may be executed by a computer as part of a computer program. In such a case the computer program may be stored on a non-transitory computer readable medium such as a CD, DVD, flash drive, or other such hardware.

What is claimed is:

1. A method for determining a position of at least one eye of a subject in images captured by a remote eye tracking system, the method comprising:
    illuminating a face of a subject using at least one infrared (IR) illuminator off-axis from at least one image sensor;
    capturing at least one image of the face using the at least one image sensor at a time instant; and
    using a processing circuitry of the remote eye tracking system, performing processing steps of:
    determining at least one pupil candidate associated with the at least one image;
    determining at least one glint candidate associated with the at least one image, wherein the at least one glint candidate is determined by detection of a bright area of pixels in the at least one image;
    determining at least one further glint candidate associated with the at least one image, wherein determining the at least one further glint candidate comprises determining an angle of a line between the at least one glint candidate and the at least one further glint candidate satisfying an angle of line threshold;
    determining at least one pupil-glint candidate group, comprising at least one pupil candidate and at least one corresponding glint candidate;
    generating a score value for each of the at least one pupil-glint candidate groups; and
    determining an eye position of at least one eye of the subject in the at least one image based on the pupil-glint candidate group with the highest score value.

2. The method of claim 1, wherein the brightness of said bright area is larger than a glint brightness threshold.

3. The method of claim 1, wherein the radius of said bright area satisfies a glint radius threshold.

4. The method of claim 1, wherein the pupil candidate is determined by detection of a bright area of pixels in an inverted at least one image.

5. The method of claim 4, wherein the brightness of the bright area of pixels in the inverted at least one image is larger than a pupil brightness threshold.

6. The method of claim 4, wherein the radius of said bright or dark area satisfies a pupil radius threshold.

7. The method of claim 1, wherein the pupil candidate is determined by detection of a dark area of pixels in the at least one image.

8. The method of claim 7, wherein the brightness of said dark area is smaller than the pupil brightness threshold.

9. The method of claim 1, wherein in the method, a glint candidate is considered to be adjacent to a pupil candidate if the distance between the glint and the pupil candidates is below a distance threshold.

10. The method of claim 1, wherein the step of generating the score value for each of the pupil-glint candidate groups is based on determining at least one of a distance between each glint candidate and each pupil candidate or brightness of the glint candidate.

11. The method of claim 1, wherein the maximum number of glint candidates for each pupil candidates in the pair of pupil-glint candidate groups corresponds to a number of IR illuminators in the remote eye tracking system.

12. The method of claim 1, wherein the method is performed by capturing a first image using a first image sensor and a second image using a second image sensor, the first and second images being captured at the time instant, producing stereoscopic images.

13. The method of claim 12, wherein generating the score value is based on determining a distance between each pupil-glint candidate group in stereoscopic images respectively.

14. The method of claim 1, wherein the at least one image is a full-frame image.

15. A non-transitory computer-readable storage medium storing instructions which, when executed by processing circuitry of a remote eye tracking system, cause the eye tracking system to perform the method steps of claim 1.

16. A remote eye tracking system for determining a position of at least one eye of a subject in images captured by at least one image sensor associated with the remote eye tracking system, the remote eye tracking system comprising at least one infrared (IR) illuminator off-axis from at least one image sensor and comprising a processing circuitry being configured to:
    determine at least one pupil candidate associated with the at least one image;
    determine at least one glint candidate associated with the at least one image, wherein the at least one glint candidate is determined by detection of a bright area of pixels in the at least one image;
    determine at least one further glint candidate associated with the at least one image, wherein determining the at least one further glint candidate comprises determining an angle of a line between the at least one glint candidate and the at least one further glint candidate satisfying an angle of line threshold;

determine at least one pupil-glint candidate group, comprising at least one pupil candidate and at least one corresponding glint candidate;

generate a score value for each of the at least one pupil-glint candidate groups; and determine an eye position of at least one eye of the subject in the at least one image based on the pupil-glint candidate group with the highest score value.

17. The remote eye tracking system of claim 16, wherein the system is configured to be used with a subject being a non-human primate (NHP) subject, for example macaques, chimpanzees, bonobos or gorillas.

\* \* \* \* \*